United States Patent [19]

Schwarz et al.

[11] Patent Number: 4,800,454
[45] Date of Patent: Jan. 24, 1989

[54] STATIC CHARGE PROTECTION FOR MAGNETIC THIN FILM DATA TRANSDUCERS

[75] Inventors: Edward L. Schwarz, Minneapolis; Beat G. Keel, Prior Lake, both of Minn.

[73] Assignee: Magnetic Peripherals Inc., Minneapolis, Minn.

[21] Appl. No.: 83,408

[22] Filed: Aug. 10, 1987

[51] Int. Cl.$^4$ ............................ G11B 5/60; G11B 5/30
[52] U.S. Cl. ..................................... 360/103; 360/123
[58] Field of Search ............... 360/103, 110, 123, 124, 360/126

[56] References Cited

U.S. PATENT DOCUMENTS 4,317,149  2/1982  Elser ................................. 360/126

FOREIGN PATENT DOCUMENTS 54-22815  2/1979  Japan ................................. 360/123
60-103512  6/1985  Japan ................................. 360/124

OTHER PUBLICATIONS

IBM Technical Disclosure Bulletin, vol. 17, No. 9, Feb. 1975, p. 2549, Thin Film Transducer Protection.

Primary Examiner—John H. Wolff
Attorney, Agent, or Firm—Edward L. Schwarz; Joseph A. Genovese

[57] ABSTRACT

A thin film magnetic data transducer carried on the end of a conductive flyer has its magnetic pole electrically connected to the flyer to prevent electrostatic discharges between the flyer and the pole tip from eroding the pole tip. The winding of the transducer is also electrically connected to the flyer either through a high resistance, through a diode with high forward and reverse voltage drops, or through a fusible link, so as to bleed off static charges on the winding without their arcing through to the magnetic pole and damaging the insulation between the winding and the magnetic pole. These embodiments avoid any degrading of the data readback signal.

9 Claims, 2 Drawing Sheets

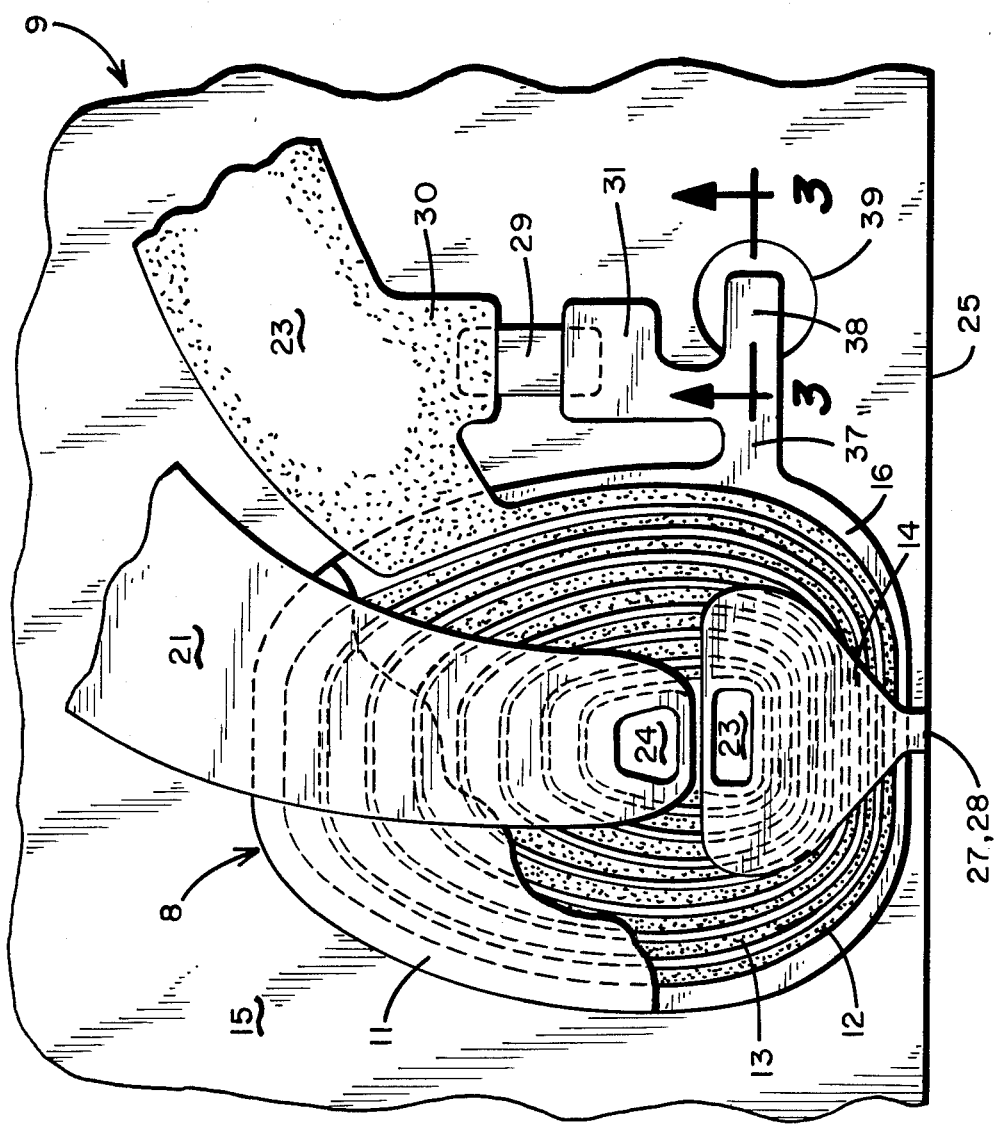
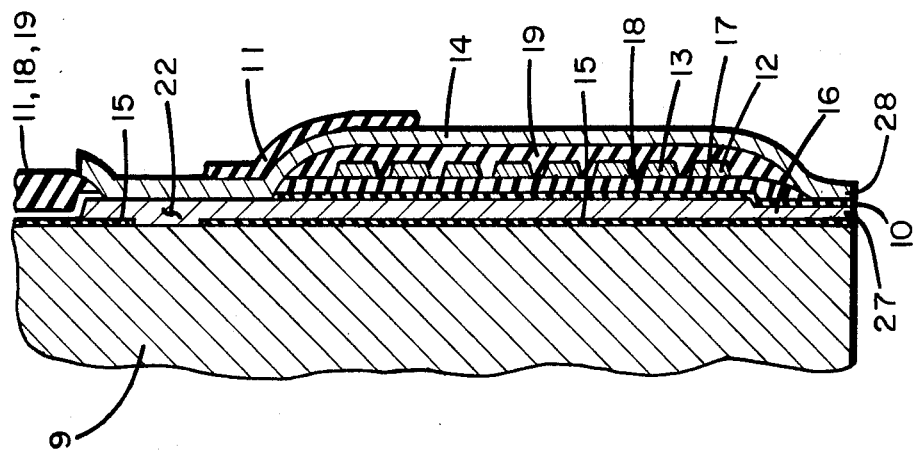

STATIC CHARGE PROTECTION FOR MAGNETIC THIN FILM DATA TRANSDUCERS

BACKGROUND/INFORMATION DISCLOSURE STATEMENT

One of the most common mass storage devices used with computers of all sizes is the so-called hard disk drive, taking its name from the rigid disk on which data is recorded as magnetic patterns in a thin layer of a magnetic recording medium on the disk surface. The data is recorded and read by a magnetic transducer or head carried by a flyer which is aerodynamically suspended above the rotating disk so as to maintain the tips of the transducer's magnetic core closely spaced to the magnetic coating surface. The transducer is often produced through a conventional thin film process. Because a preferred ceramic material frequently used for the flyer is somewhat conductive, it is necessary to start the transducer-forming process on this material with deposition of an insulating base layer, usually alumina, on its surface, which prevents shorting of the electical winding.

It has been discovered that electrostatic charges can build up on various of the elements of a transducer so mounted on a conductive flyer and separated from it by an insulating layer, see U.S. Pat. No. 4,317,149 (Elser). Elser describes one mechanism by which such charges can be created on the transducer. These charges arc arcoss the edge of the insulating layer between the pole tips and the flyer itself, and cause erosion of the pole tips. This is not desirable, because continued arcing will cause the pole tips to recede from the edge of the flying surface, resulting in degraded performance of the transducer in reading and writing the data. It is felt that charges on the core may be created at almost any time in the life of the transducer, so that arcing must be continuously avoided.

We believe an alternative condition also obtains, whereby a voltage potential may be induced in the leads from a neighboring electrostatic field after they are attached to the transducer winding. This induced voltage may cause the perforation of the insulating material surrounding the winding because of its relatively low breakdown voltage, or may cross the insulation capacitively from the winding to the core. Even though the potential induced in the leads may be only in the tens of volts, the voltage passes through the winding insulation by either of these mechanisms to the core and then arcs from the pole tips to the flyer. This is possible because the extreme thinness of the insulating layer separating the transducer pole tips from the flyer results in a relatively small breakdown voltage. The winding insulation may well be damaged if arcing between the winding and the core occurs, causing the performance of the transducer to be degraded and perhaps even completely destroyed. It is believed that once the leads are attached to the circuitry which produces the write signal and receives the read signals, the circuitry's input impedance is low enough to prevent these electrostatically-induced voltages from building up on the leads and causing damage.

Another problem less well known at the present time, is that arcing may dislodge particles which are of a size capable of causing a crash of the flyer, where the aerodynamic suspension fails and the flyer strikes the recording layer surface, dislodging more and then even more particles in an avalanche pattern. This is true even if the arcing occurs before the transducer is placed in service, since the debris dislodged may adhere to the flyer until it is placed in service.

The Elser patent deals with the electrostatic discharge problem by providing alternative, lower breakdown voltage arcing paths remote from the pole tips, so that the arcing can occur without causing damage to the pole tips. But this approach does not solve the problem caused by particles dislodged by arcing. Nor does it deal with the problem of voltage induced on the winding which causes internal arcing. We feel is desirable to completely avoid arcing both externally and internally so as to reduce or eliminate the problems decribed.

BRIEF DESCRIPTION OF THE INVENTION

Since the use of arcing to discharge electrostatically induced potential has these disadvantages, our invention takes the alternate approach of dissipating electrostatic charges on the transducer conductively to the flyer. We have a different embodiment to deal with each of the mechanisms by which charges are created. In the first embodiment, the transducer's conductive magnetic core is connected electrically to the flyer through an opening in the insulating layer on which the transducer lies. Charges occurring adjacent the core are conducted directly to the flyer either through an insulating layer opening on which the magnetic core lies, or through an insulating layer opening to one side of the transducer to which a conductor path leads from the transducer's core. In either case voltage buildup across the insulating layers adjacent to the core is prevented.

In the second embodiment, the winding's potential relative to the flyer is limited by a conductive path which does not interfere with the reading and writing functions of the transducer. In a first variation on this embodiment, a varistor whose breakdown voltage is higher than the write voltage to be applied when the transducer is placed in use comprises the conductive path. Since it is apparently not now technically possible to create this component on the insulating layer adjacent the transducer with the same photolithographic operations which create the transducer itself, a discrete component must be attached. The varistor must have very low noise so as not to interfere with the relatively small readback signals. In an alternative design we use a relatively high value resistor to slowly bleed the charges from the winding. The value of the resistor must be made large enough to suppress any noise leaked backwards from the flyer to the winding during reading and small enough to efficiently bleed the charges from the winding before sufficient voltage is built up to cause arcing from coil to core and then from core to flyer.

Another variation on the second embodiment, and the one we currently prefer, is for use in dissipating electrostatically induced potential on the winding before it is connected to the circuitry, believed to be the usual case. This variation employs a low resistance bleeder conductor having a very low current-carrying capacity as the conductive path to the flyer body. After the winding is connected to the read-write circuitry, a relatively large current is passed between the winding and the flyer body. This burns out the bleeder path, disconnecting the winding from the flyer. Since the path is destroyed remotely from the active elements of the transducer and beneath a protective coating, no debris is produced to contaminate the flyer assembly and disk drive chamber. Even though the current carrying capacity of a properly designed bleeder path is very low, its linearity allows constant discharging of even the least amount of potential, and its current-carrying capacity is never exceeded until it is burned out when placed in use.

Accordingly, one object of the invention is to avoid damage to the pole tips of thin film transducer caused by arc discharge of static electricity built upon the transducers.

A second object is to create the discharge through a non-arcing conductive path.

Yet another object is to employ the same photolithographic operations in creating the discharge path that is used in forming the transducer itself.

Another object is to avoid contamination of the flyer assembly and the disk drive enclosure.

A further object is to prevent arcing through the material which insulates the winding from the pole.

Still another object of the invention is to allow creation of the discharge path to be easily integrated into the overal construction of the flyer assembly.

Other objects and advantages of the invention are described below.

BRIEF DESCRIPTION OF THE DRAWINGS

FIG. 1 is a plan view of a thin film transducer having the bottom pole of the magnetic core connected electrically to the flyer body and a winding protected by a fusible link.

FIG. 2 is a side section view of a thin film transducer of the type shown in FIG. 1, and whose bottom lies on an opening in the insulating layer on the flyer body and is electrically connected to the flyer body therethrough.

DESCRIPTION OF THE PREFERRED EMBODIMENTS

Figure 4:
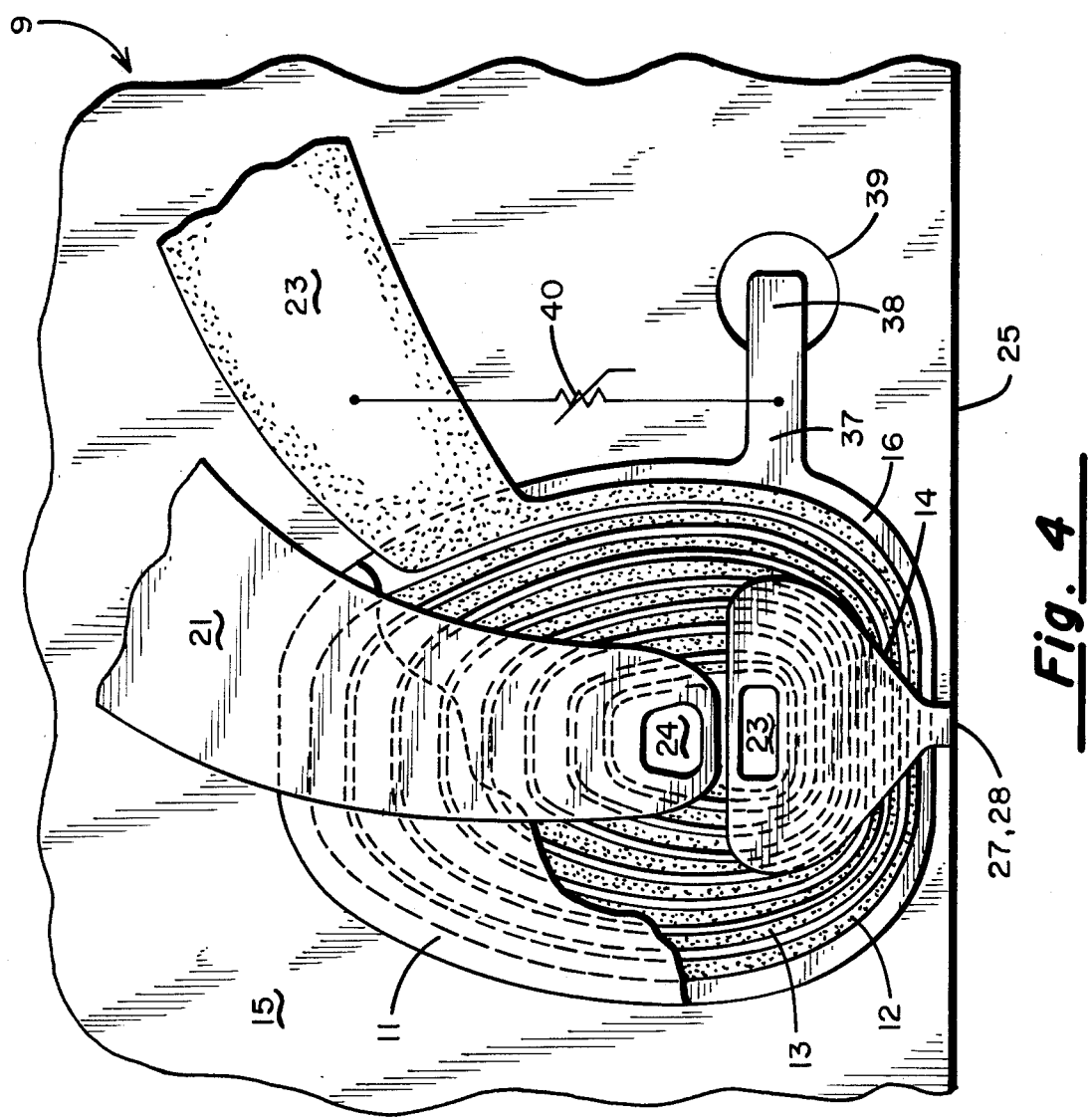
FIG. 4 is a plan view of a thin film transducer having its winding protected by a varistor physically attached to the flyer body adjacent the transducer.
Figure 3:
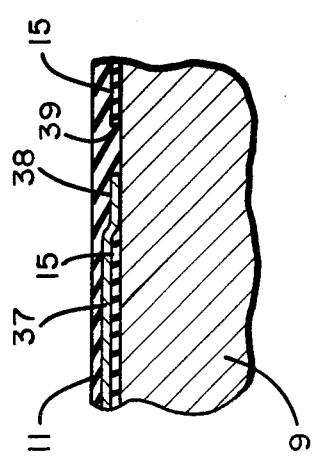
FIG. 3 is a section view of the connection of the conductive path in FIG. 1 from the bottom pole to the flyer body.

Turning first to FIG. 1, the thin film transducer 8 shown therein in plan view is mounted on the end surface of a flyer body 9 which is insulated from the transducer by an insulating base layer 15 made of alumina or other hard material, and is better shown in the cross sections of FIGS. 2-4. Flying surface 25 supports the entire assembly when in use so that the pole tips 27, 28 of the transducer are positioned a few microinches from the recording medium, not shown. The entire transducer 8 is formed by photolithographic deposition processes which allow its various elements to be formed with high accuracy and the very small dimensions necessary for superior operating characteristics. Each of the metal layers are formed electrolytically, with a seed layer initially deposited in the area receiving the metal layer to provide the conductive surface for the deposited metal and to provide for proper adhesion of the metal layer to the substrate. Each metal layer can be considered to include the thin seed layer forming its bottom few microinches. Each seed layer is formed by standard vacuum deposition and photolithographic patterning processes.

The transducer includes a flux path defined by a bottom pole 16 formed of Permalloy or other metallic magnetic material which is deposited into the desired pattern with high accuracy. Referring to FIG. 2 as well as FIG. 1 to assist in further describing the construction of transducer 8, the pole tip 27 is shown therein as projection from pole 16. The seed layer is deposited directly on the alumina layer 15 in the area to be occupied by bottom pole 16.

A second layer of alumina 17 is also shown in FIG. 2 which lies on the pole 16 and forms the non-magnetic material defining the flux gap 10. Alumina or some other hard material is needed here to resist the abrasion and provide the strength necessary in the flux cap. A multi-turn winding 12 having individual turns 13 etc. lies above the bottom pole 16 and is insulated from it by an insulating layer 18. A second layer of insulation 19 is deposited on the winding 12 and the upper pole 14, made from the bottom pole's magnetic material, is then deposited on this second insulation layer 19. Upper pole 14 makes electrical and magnetic connection with the lower pole 16 at the junction 24 so as to complete the magnetic circuit between them. The pole tips 27, 28 then define between them the flux gap 10 shown in FIG. 2.

The winding 12 has an upper signal lead 21 which is connected to the end of the innermost turn and lies on the insulating layer 11. A lower signal lead is connected to the end of the outermost turn of winding 12, and it is to those two signal leads that the write signals are applied and from which the readback signals are received. The leads 21, 23 terminate in connection pads, not shown, many times larger than the transducer itself. Each of these metal layers have a seed layer forming the first few microinches of them.

In FIGS. 1 and 3 a first embodiment of the invention is shown as an arm projecting from bottom pole 16, said arm forming a conductive bleeder path 37. Path 37 is formed in the same processing steps which form pole 16. Path 37 leads to and terminates in an opening 39 in the insulating layer 15 on the flyer body 9. The deposition process creates an ohmic contact 38 between the path 37 and flyer body 9. Accordingly, as electrostatic charges reach the core by whatever mechanism, they are promptly bled to flyer body 9 by path 37 and contact 38. Since the contact 38 has little voltage drop, these charges are bled away before the voltage on the poles 14 and 16 can reach a level which can cause arcing.

FIG. 2 shows a second approach for connecting the transducer core to flyer body 9. An opening 22 is created in the insulating layer 15 and the core is formed over this opening 22, thus automatically creating the connection between the flyer body 9 and the pole itself.

As explained earlier, it is also believed to be important to electrically connect winding 12 to the flyer body 9. One way to accomplish this is by the conductive bleeder path 29 shown in FIG. 1, which is preferably carried directly on insulating layer 15. Path 29 is preferably a part of one of the seed layers deposited on an insulating layer and used to aid deposition of a metal layer of the transducer. It is not particularly important which seed layer is involved, so the one chosen should be the most convenient. Path 29 is formed in the seed layer either by removing portions of the seed layer after it is deposited, or by masking areas to define openings 32 at the time seed layer is deposited on the insulating layer. At the present time, we believe that for a seed layer which is typically 5 microinches (0.12 micron) thick, path 29 can be 10 to 50 microns (400 to 2000 microinches) wide, so that the total cross section area of path 29 is around 1 to 5 sq. microns. This is believed to be sufficient to conduct a peak current of several hundred microamperes. Since path 29 is always bleeding charges off as they occur, we do not expect the peak electrostatic discharge current to ever exceed a few tens of microamperes.

Projection 30 from winding lead 23 and projection 31 from bleeder path 37 overlie opposite ends of path 29 and are electrically connected to and by it. Path 29 thus forms a low resistance, low current-carrying capacity bleed path from the winding 12 to flyer body 9.

After the lead wires have been connected to the connector pads, as explained above, it is believed that the winding is at risk of acquiring from electrostatic fields adjacent these lead wires electrical charges, which if not dissipated will generate a voltage potential which can arc through insulating layer 18 or 19 to one of the poles 14 or 16, possibly damaging the layer involved by shorting the winding 12 to the core. However, the presence of bleeder path 29 removes these charges as soon as they are created in winding 12 by the connecting wires. Since this potential builds up relatively slowly, low current-carrying capacity in path 29, say in the tens of microamperes, is sufficient to remove these voltage potentials.

Electrical connection between the winding 12 and flyer body 9 is undesirable during normal operation of the transducer assembly. Accordingly, after leads 21 and 23 are connected to the circuitry which handles the data signals and before the assembly is placed in service, a current source of several hundred milliamperes is placed between one of the winding leads 21 or 23 and the flyer body 9. This current burns out and destroys bleeder path 29. Consequently, there is no longer any electrical connection between winding 12 and flyer body 9. Since layer 11 covers path 29, the small amount of debris resulting from burning out bleeder path 29 is buried and cannot escape to contaminate the flyer assembly.

In FIG. 4, an alternative means for removing potential from the winding is illustrated. A varistor 40 is connected between winding lead 23 and bleeder path 37, and whose breakdown voltage in each direction is selected to be slightly greater than the maximum write voltage, typically 5 to 50 v. By "varistor" is meant any electrical component or group of components which has approximately the same amount of voltage drop, or breakdown voltage in each direction, and whose breakdown voltage can be specified or controlled by the designer. When the electrostatically induced potential exceeds the varistor's breakdown value, current flows to maintain the maximum potential between the winding 12 and the flyer body 9 at the breakdown value. Thus, protection is available at all times, rather than only during fabrication and before the assembly is placed in service. This may be valuable if it is found in the future that charges on winding 12 are a problem even after the winding is attached to the drive circuitry.

It would be preferable that the varistor 40 be created in situ on the flyer body so as to reduce the bulk, improve reliability, and simplify construction. Unfortunately, there is no simple system known by which the varistor 40 may be created in situ on a flyer body 9 made from the Alsimag or other conductive flyer material. Accordingly, to accomplish this variation, it is necessary to mount a discrete varistor on the same part of the flyer body 9 and connected between one of the winding leads 21 or 23 and the flyer body. In certain circumstances, the varistor may be replaced by a simple resistor of great enough ohmage to avoid affecting the readback of data, and low enough ohmage to allow static potential to be bled away.

We claim:

1. In a thin film magnetic data transducer and conductive air bearing flyer assembly for use in a disk memory system, said transducer carried on an end surface of the flyer intersecting the air bearing surface, and separated from the flyer body by an insulating layer, a pole tip of a conductive magnetic core of said transducer being adjacent the flyer body at the intersection of the end and air bearing surfaces and separated therefrom by the insulating layer, and permitting electrostatic discharges between the pole tip and the flyer body, an improvement for preventing such discharges comprising:
 a. an area of the insulating layer having an opening; and
 b. a conductor comprising an arm on the magnetic core projecting into the opening and making electrical contact with the flyer body thereat.

2. In a thin film magnetic data transducer and conductive air bearing flyer assembly for use in a disk memory system, said transducer carried on an end surface of the flyer intersecting the air bearing surface, and separated from the flyer body by an insulating layer, a pole tip of a conductive magnetic core of said transducer being adjacent the flyer body at the intersection of the end and air bearing surfaces and separated therefrom by the insulating layer, and permitting electrostatic discharges between the pole tip and the flyer body, an improvement for preventing such discharges comprising:
 a. an area of the insulating layer having an opening;
 b. a conductor making electrical contact with the flyer body at the opening and with the magnetic core; and
 c. a winding insulated from the magnetic core and a signal lead therefrom and an electrical connection between the signal lead and the flyer body.

3. The assembly of claim 2, wherein the electrical connection comprises a circuit component having a voltage drop in each direction slightly greater than 5 to 50 volts.

4. The assembly of claim 2, wherein the electrical connection comprises a varistor having a voltage drop in each direction slightly greater than 5 to 50 volts.

5. The assembly of claim 2, wherein the electrical connection between the flyer body and the signal lead comprises a conductive path having a peak current-carrying capacity of several hundred microamperes.

6. The assembly of claim 5, wherein the conductive path having a peak current-carrying capacity of several hundred microamperes has a total cross section area around 1 to 5 sq. microns.

7. A method of using the assembly of claim 5, including the steps of attaching wire leads to the signal leads of the transducers, connecting the signal leads to the circuitry receiving and generating the data signals, and applying a voltage between the signal lead and the flyer body which causes a current to flow through the low current-carrying capacity conductive path sufficient to destroy its current-carrying ability.

8. In a thin film magnetic data transducer and conductive air bearing flyer assembly for use in a disk memory system, said transducer carried on an end surface of the flyer intersecting the air bearing surface and having a signal lead, and separated from the flyer body by an insulating layer, a pole tip of a conductive magnetic core of said transducer being adjacent the flyer body at the intersection of the end and air bearing surfaces and separated therefrom by the insulating layer, and permitting electrostatic discharges between the pole tip and the flyer body, an improvement for preventing such discharges comprising:
  a. an area of the insulating layer having an opening and exposing an area of the flyer body; and
  b. a conductive path from the signal lead to the area of the flyer body exposed by the opening, said conductive path having a peak current-carrying capacity of several hundred microamperes.

9. In a thin film magnetic data transducer and conductive air bearing flyer assembly for use in a disk memory system, said transducer carried on an end surface of the flyer intersecting the air bearing surface and having a signal lead, and separated from the flyer body by an insulating layer, a pole tip of a conductive magnetic core of said transducer being adjacent the flyer body at the intersection of the end and air bearing surfaces and separated therefrom by the insulating layer, and permitting electrostatic discharges between the pole tip and the flyer body, an improvement for preventing such discharges comprising:
  a. an area of the insulating layer having an opening and exposing an area of the flyer body; and
  b. a circuit element having a predetermined non-zero voltage drop and connected from the signal lead to the flyer body area exposed by the opening.

* * * * *